May 30, 1972    3,666,599

SONIC OR ULTRASONIC SEAMING APPARATUS

Filed Nov. 27, 1970    3 Sheets-Sheet 1

Edward G. Obeda
INVENTOR.

BY:

Ervin B. Steinberg $V_S = V_M + V_T$

Edward G. Obeda
INVENTOR.

United States Patent Office 3,666,599
Patented May 30, 1972

3,666,599
SONIC OR ULTRASONIC SEAMING APPARATUS
Edward G. Obeda, Brookfield, Conn., assignor to Branson Instruments, Incorporated, Stamford, Conn.
Filed Nov. 27, 1970, Ser. No. 93,151
Int. Cl. B29c 27/08; B23k 1/06
U.S. Cl. 156—380
16 Claims

ABSTRACT OF THE DISCLOSURE

A sonic or ultrasonic seaming apparatus uses a driven rotating anvil and an opposing resonator also called "horn" which is coupled to a source of sonic or ultrasonic energy. The speed of the driven anvil, and consequent workpiece feed rate, is coordinated with the velocity of the frontal surface of the resonator imparting the sonic or ultrasonic energy to the workpiece. This is accomplished by an electronic circuit in which the applied voltages to the power supply and to the motor for the anvil assume a predetermined relationship.

---

The present invention refers to a seaming apparatus using sonic or ultrasonic energy for effecting a bond between soft materials made partially or entirely of thermoplastic fibers or constituents.

The use of sonic or ultrasonic energy for seaming polymeric thermoplastic sheet material is well known in the art. Such apparatus are shown and described for instance in U.S. Patents No. 2,633,894, P. B. Carwile dated Apr. 7, 1953, "Plastic Welding"; No. 3,217,957, A. G. Jarvie et al. dated Nov. 16, 1965, "Welding Apparatus"; No. 3,222,235, N. Bucher dated Dec. 7, 1965, "Method of Manufacturing Infusion Bags"; No. 3,242,029, H. Deans dated Mar. 22, 1966, "Ultrasonic Sealer for Sealing Plastics," or No. 3,294,616, S. G. Linsley et al. dated Dec. 27, 1966, "Apparatus for Sealing Polymeric Sheet Material by Ultrasonic Energy."

Recently woven textile materials have come into use which are made partially or entirely of thermoplastic fibers. In many cases there is a blend of natural and thermoplastic fibers.

The need for joining these materials without the conventional sewing method, that is without needle and thread, has been evident. Therefore, renewed attention has been given to joining these materials by an ultrasonic bond and work has been carried out toward providing a sonic or ultrasonic seaming apparatus which is operable in a manner similar to that of a conventional sewing machine. One of the requirements of such a machine is that it be operable at a variable material feed rate, that the feed rate be under the control of an operator, and be variable substantially instantaneously. As is well known, a conventional sewing machine is provided with a variable speed control which remains under the control of an operator and is variable over a wide range by means of a foot or knee pressure actuated control device.

In carrying out various tests, it became evident that proper seaming of the materials subjected to sonic or ultrasonic energy is obtained only if the velocity of the resonator, which is the coupling member between the source of vibratory energy and the workpiece to be seamed, is varied so as to be responsive to the feed rate of the workpiece through the seaming station.

The present invention, therefore, describes a sonic or ultrasonic seaming apparatus in which the feed rate of the workpiece through the seaming station and the velocity of the resonator are interconnected in such a manner that both are varied in a predetermined relationship.

More specifically, the present invention concerns an ultrasonic seaming apparatus in which a workpiece is adapted to be fed at variable speed through a seaming station in a continuous motion and means are provided for controlling the velocity of the resonator as a function of the feed rate.

As used herein velocity of the resonator shall be defined as the peak displacement amplitude at the output surface of the resonator per unit of time in a direction toward the workpiece. The velocity, expressed in inches or feet per second, assuming constant frequency operation, changes proportionately with the motional amplitude of the output surface of the resonator. For details concerning the design and construction of resonators, also called tools, horns, velocity or amplitude transformers, concentrators, etc. reference is made to the book entitled "Ultrasonic Engineering" by Julian R. Frederick, John Wiley & Sons, Inc., New York, N.Y. (1965), pages 87 through 103.

For a more detailed understanding of the present invention reference is made to the following description when taken in conjunction with the accompanying drawing, in which.

Figure 1:
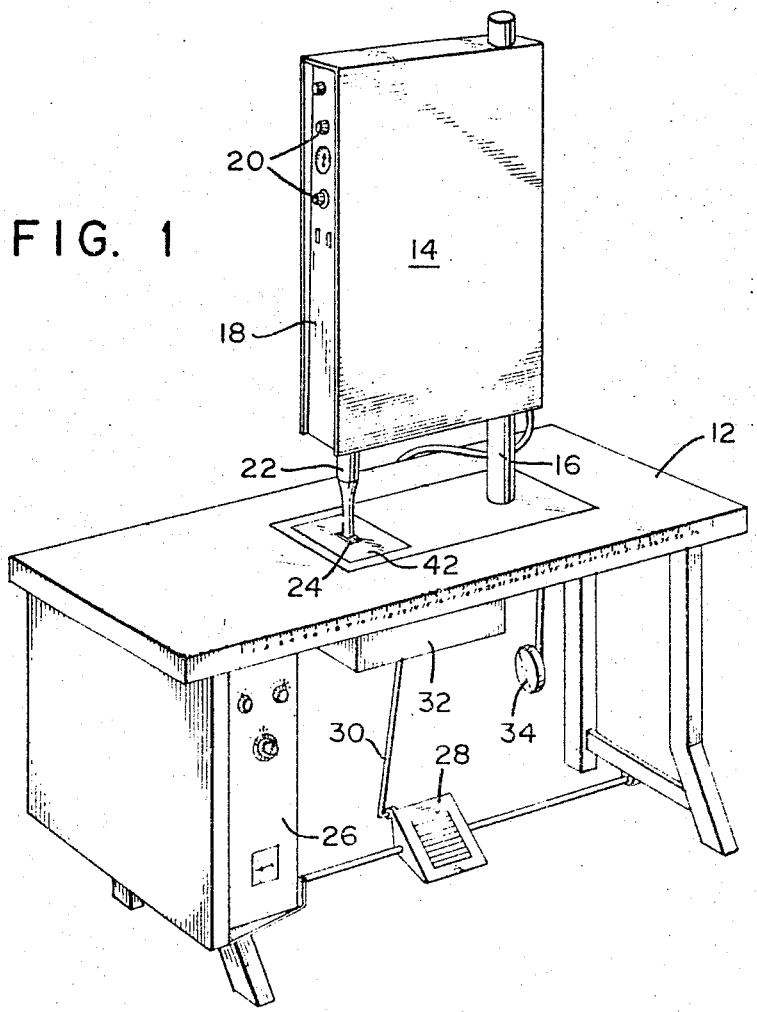
FIG. 1 is a perspective view of the ultrasonic seaming apparatus.

Referring now to the figures and FIG. 1 in particular, numeral 12 identifies the top of a table forming the work station. A source of sonic or ultrasonic energy is contained in an enclosure 14 which is supported from a vertical standard 16. A control panel 18 contains various controls 20 for adjusting the sonic or ultrasonic source in a manner that is well known. The stand supporting the source, for all practical purposes, is a commercial device and may be obtained from various sources, typically it may be a model 227 stand available from the Branson Sonic Power Company, Commerce Park, Danbury, Conn. The source of sonic or ultrasonic energy is a converter 10, FIG. 5, which is fitted with a resonator 22. The converter 10 provides mechanical output oscillation in response to applied high frequency electrical energy. To this end, the converter 10 is provided with either magnetostrictive or piezoelectric transducing means. A converter suitable for this purpose and using piezoelectric transducing means is described, for instance, in U.S. Pat. No. 3,328,610 issued to S. E. Jacke et al. dated June 27, 1967 entitled "Sonic Wave Generator."

The frontal or output surface of the resonator 22 is mounted opposite a rotatable wheel 24 which forms an anvil. The frontal surface of the resonator and the rotating wheel 24 together form a nip through which material to be seamed or bonded is fed and the resonator, when oscillating at its resonant frequency, imparts sonic vibrations to the material to cause fusing or bonding in a manner that is well understood in the art.

Referring further to FIG. 1, an electrical power supply 26 is mounted to the table and the construction of this power supply will be described later in greater detail. The power supply receives power line voltage electrical energy and provides via a cable high frequency electrical energy to the converter 10. Typically, the converter 10 is energized with a frequency in the range from 20 to 40 kHz., but it shall be understood that this range is merely illustrative of typical operating conditions. A pressure responsive foot control 28 is connected via a mechanical linkage rod 30 to a control box 32 which contains a means for driving the wheel 24 at variable speeds in order to adjust the feed rate of the workpiece through the seaming station, and includes, moreover, a means for controlling the velocity of the resonator by controlling the power supply 26. It should be noted that the control 28 has a dual function, that is, controlling the feed rate of the material and also the velocity of the resonator in a predetermined and coordinated manner as will be described in connection with FIG. 4. FIG. 1 show, a further, a knee pressure operable control 34 which is adapted to cause a lifting and lowering of the resonator 22 by a predetermined amount in order to facilitate the insertion and removal of the workpiece into the working area. For this purpose the converter 10 and horn 22 are mounted for vertical motion responsive to fluid pressure as shown for instance in U.S. Pat. No. 3,493,457 issued to John Jugler, dated Feb. 3, 1970 entitled "Control circuit for Tool Driven by Sonic Energy."

Figure 3:
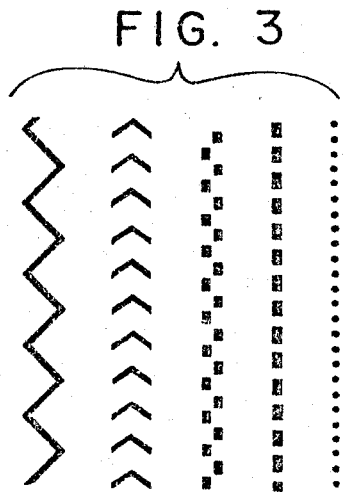
FIG. 3 is a schematic view of various seaming or bonding patterns.
Figure 2:
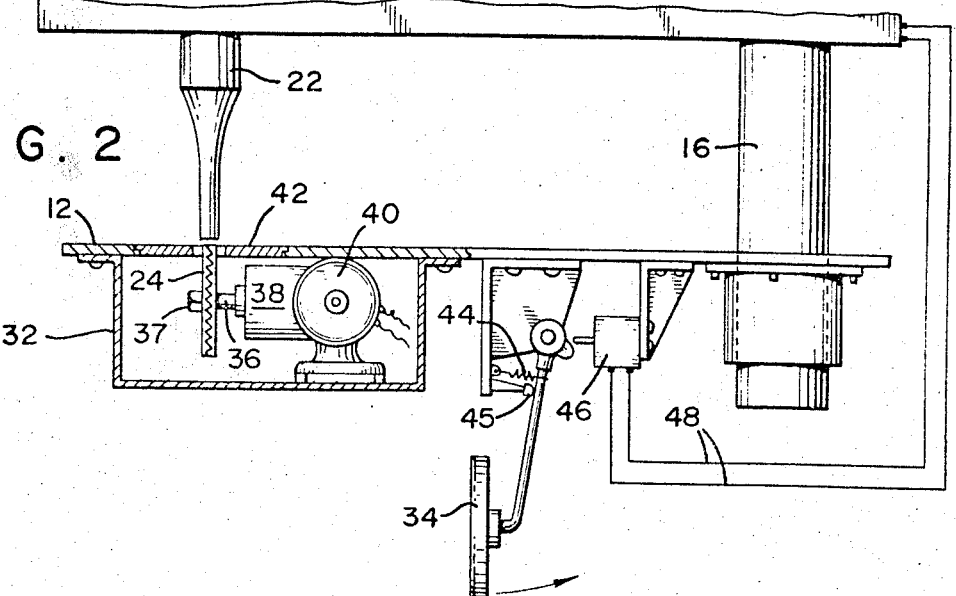
FIG. 2 is a vertical view, partially in section, of the seaming station.

FIG. 2 shows the arrangement of the seaming or bonding station in greater detail. The wheel 24 is mounted for rotation upon a shaft 36 extending from a gear reducer 38 which is driven by an electric motor 40. In order to change the wheel 24, which as illustrated has a raised zig-zag pattern, a removable nut 37 is provided. Upon lifting the insert plate 42, which is similar to a bobbin cover plate on a standard sewing machine, the wheel 24 can be removed and another wheel mounted upon the shaft. Typical patterns which can be provided along the wheel rim are shown in FIG. 3.

The knee operable control 34, when pushed toward the right as seen in FIG. 2 against the force of the spring 44, actuates a switch 46 which via electrical conductors 48 actuates a solenoid valve (not shown) to cause lifting of the converter 10 and resonator 22 by a predetermined amount, such as one inch. Upon releasing the control 34 the spring 44 returns the control 34 against the stop 45 and the resonator 22 assumes its lowered position. The frontal end of the resonator is not brought to actual contact with the wheel, but a small gap is provided for permitting the material to be fed through the nip and allow for the elongation of the resonator 22 when rendered resonant. A micrometer adjustment for setting the gap (not shown) is provided. The resonator 22 generally is of bar shape and is rendered resonant along its longitudinal axis. The resonator is dimensioned so that its frontal surface is disposed substantially at an antinodal region.

One of the salient features of the present invention resides in the coordinated control of the resonator velocity and the rate at which the workpiece or material to be seamed or bonded is fed through the nip.

Figure 7:
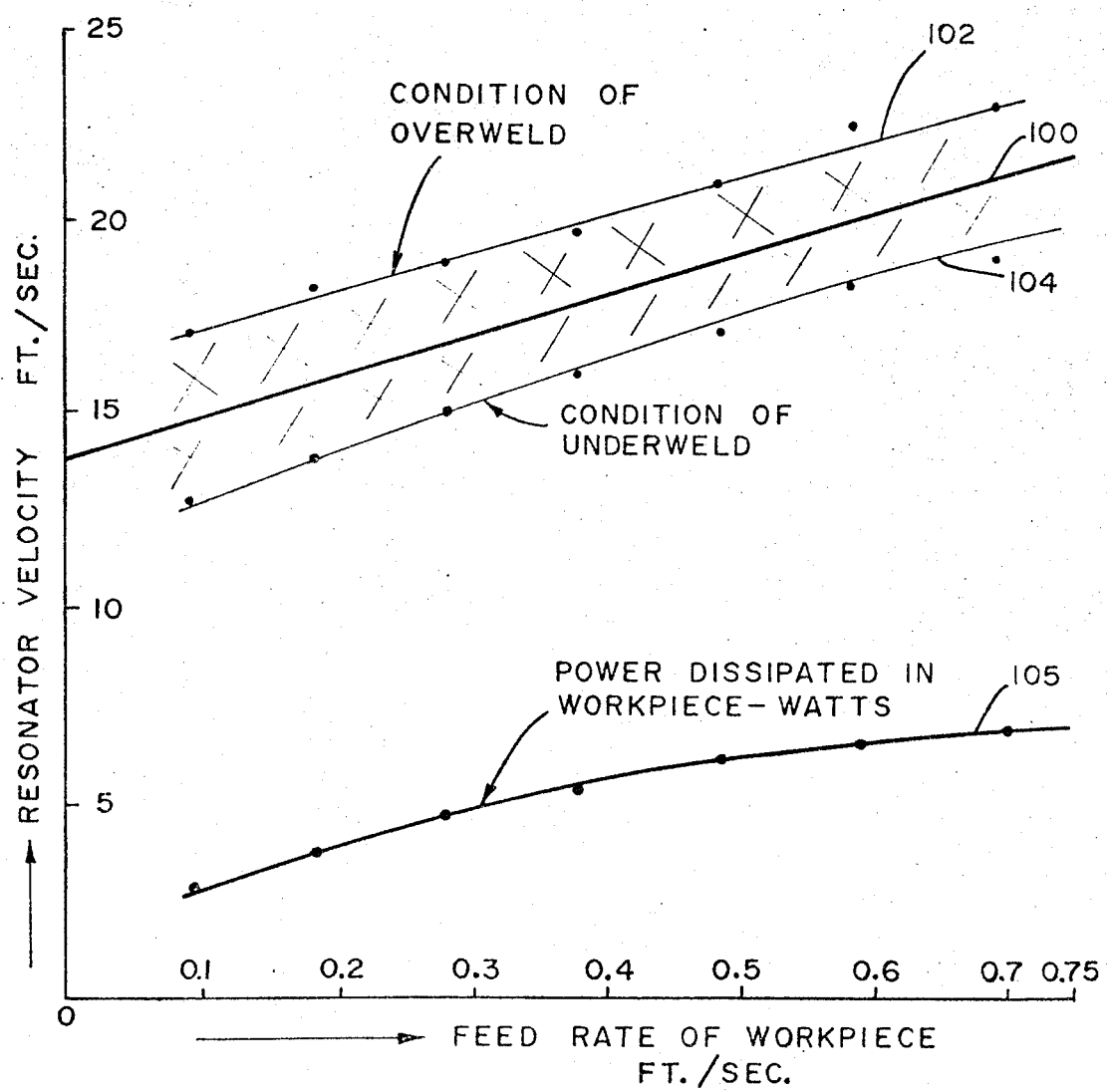
FIG. 7 is a diagram showing the desired relation between feed rate of the material and the velocity of the resonator.

FIG. 7 illustrates this relation in a more detailed manner. The graph shows the resonator velocity as a function of feed rate when seaming or bonding two superposed soft thermoplastic sheets. Curve 100 shows the optimum value of the resonator velocity derived by finding the limit condition 102 of "overweld" and the condition 104 of "underweld." The upper limit was established by observing the onset of holes in the seam caused by excessive melting of the fabric or of the fibers. Conversely, the lower acceptable limit was established by observing the condition of a complete fusing of all fibers within the seaming location. The curve 100 is a straight line, however, since the curve does not go through the origin, velocity is not proportional to feed rate. The curve follows the equation:

$$v = Ar + B$$

wherein:

$v$ is the peak velocity of the resonator in ft./sec.;
$r$ is the feed rate of the workpiece through the bonding area in ft./sec.;
$A$ is the slope of the line 100; and
$B$ is the vertical axis intercept of the line 100.

It should be noted that the sonic power dissipated by the workpiece, curve 105, decreases its slope with increasing feed rate. This phenomenon is caused probably by the fact that at higher feed rates there is a better utilization of acoustic energy in the melting zone, i.e. more energy is used for melting fibers in relation to the energy lost by conduction through the bonding equipment and the fibers into ambient. The relation per FIG. 7 can be embodied electrically by a circuit depicted in FIG. 4. A variable transformer 55 recives line voltage at terminals 106–108 and provides a variable voltage $V_M$ to the motor 40 and a variable voltage $V_S$ to the power supply 26. As the movable tap 56 is moved the voltages $V_M$ and $V_S$ are varied in coordinated relation. The voltage $V_S$ applied to the power supply 26 is proportional to the velocity of the resonator. The voltage $V_M$ is applied to the motor 40 and is proportional to the speed of the motor and, therefore, to the feed rate of the material or workpiece. The voltage $V_T$ is a constant, being taken across a fixed tap.

Figure 5:
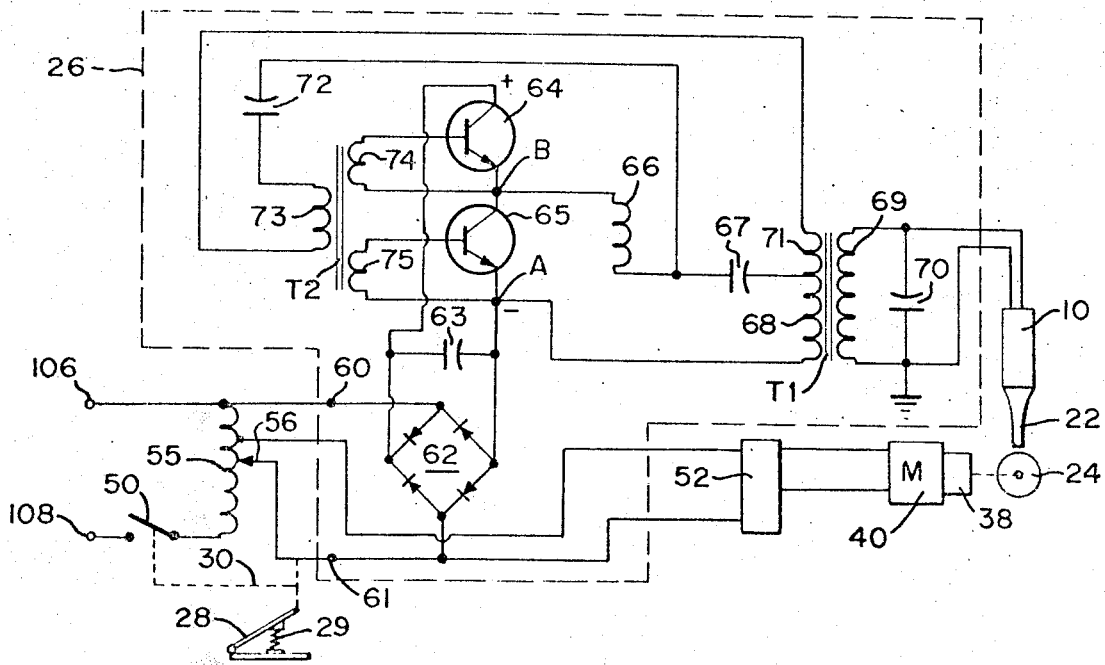
FIG. 5 is a schematic electrical circuit diagram of the power supply and control portion.
Figure 4:
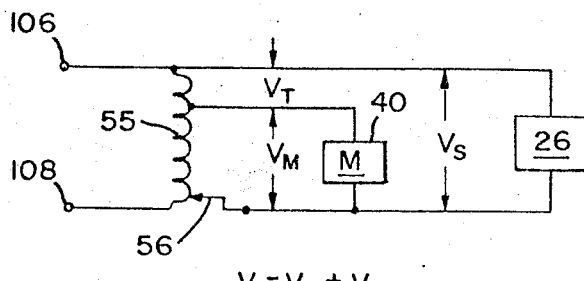
FIG. 4 is a schematic block diagram.

FIG. 5 depicts an embodiment of the circuit per FIG. 4. The foot pedal 28 is connected by the linkage 30 to the drive for the wheel 24 as well as to the electrical circuit. Upon depressing the foot control, which is urged toward its non-actuated position by a spring 29, the switch 50 will be closed. Switch 50 applies power from the alternating current network terminals 106–108, switch 50, transformer 55 and a rectifier 52 to the motor 40. The motor 40 is a direct current motor which rotates at a speed determined by the applied direct current voltage. The movable transformer tap 56 is connected to the linkage 30 and hence, as the pedal 28 is depressed, the applied voltage to the motor 40 increases and the feed rate of the workpiece through the nip increases in a corresponding manner.

Similarly, the closed switch 50 applies electrical A.C. power via the transformer 55 to the terminals 60 and 61 of the power supply 26 for the transducer 10. As the pedal 28 is depressed the voltage applied across the terminals 60 and 61 increases.

The power supply or electrical generator 26 is, in this typical example, of the type described in U.S. Pat. No. 3,432,691 issued to Andrew Shoh on Mar. 11, 1969 entitled "Oscillator Circuit for Electro-Acoustic Converter," see FIG. 7 of the patent. As described in that patent, the converter 10 is driven at its parallel resonant frequency and the motional amplitude of the converter, as apparent at the frontal surface of the resonator 22, is proportional to the applied voltage. Therefore, as the input voltage to the power supply 26 is varied the velocity of the resonator is changed also and, more specifically, within the selected operating range, the velocity of the resonator is a direct function of the applied voltage. The theory and operation of the power supply 26 has been set forth in great detail in the aforementioned patent to Andrew Shoh, but is briefly summarized for the sake of clarity of the present invention.

The positive terminal of the direct current supply comprising the rectifier 62 and filter capacitor 63 charges the capacitor 67 via the switching transistor 64, terminal B, impedance 66 and the transformer winding 68. Subsequently, the capacitor 67 discharges through the impedance 66, the terminal B, switching transistor 65, terminal A and the transformer winding 68. The circuit is in oscillation because the capacitive reactance of the load circuit (converter 10 and capacitance 70) and that of the driving circuit (primary side of transformer T1) resonate with the inductive reactance of the driving circuit. The transformer winding 71 develops a feedback signal of the same frequency, the signal being then phase-shifted by the capacitor 67 for causing it to be substantially in phase with the resistive current component of the load circuit and applied via a direct current blocking capacitor 72 to the transformer winding 73 of the feedback transformer T2. The secondary windings 74 and 75 of the transformer T2 provide a driving signal to the switching transistors 64 and 65 in order to synchronize the operation of the pulses of energy with the parallel resonance frequency of the converter 10. As indicated, the above identified patent describes and discusses the circuit in greater detail.

Another circuit suitable for driving the converter 10 is disclosed in U.S. Pat. No. 3,443,130 dated May 6, 1969 issued to Andrew Shoh entitled "Apparatus for Limiting the Motional Amplitude of an Ultrasonic Transducer." In this latter patent the converter 10 is operated at its series resonant frequency and the current supplied to the transducer must be varied in order to change the velocity of the resonator, the velocity of resonator being a function of the current amplitude. The precise circuits used for driving the resonator is not as significant as the requirement that the velocity of the resonator be controllable independent of the load impedance presented to the resonator. The above-indicated circuits serve this purpose by controlling merely the resonator velocity.

Figure 6:
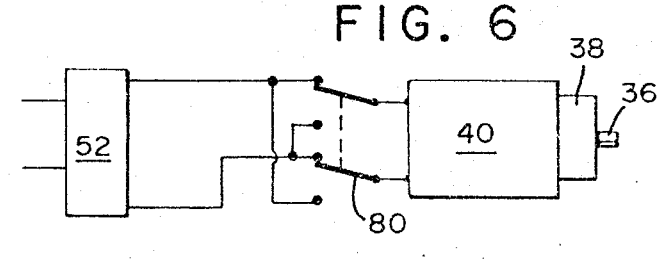
FIG. 6 is a schematic electrical circuit diagram of an additional feature.

FIG. 6 shows a modification which includes an electrical circuit reversing switch 80 for reversing the rotation of the driving wheel 24. This switch is helpful in starting or finishing the material feed.

As a further modification, the mechanical linkage 30 may be replaced by a flexible shaft, or electrical positioning means, known as selsyn or synchro, may be used. The main feature resides in the coordinated relationship between material feed rate and the velocity of the resonator. Extensive testing has shown that the voltage $V_T$ remains a constant for a large quantity of different materials, ranging from entirely to partially thermoplastic sheets or fabrics.

From the above description it will be apparent that the seaming or bonding apparatus constructed in accordance with the teaching of this invention provides an ultrasonic "sewing" machine which is readily operated by persons who previously have operated conventional sewing machines. By means of the foregoing apparatus it has been possible to fabricate dresses, ties, curtains and draperies, bags and other articles, all involving the use of textile fabrics which contain thermoplastic fibers. In many instances, the strength of the seam achieved exceeded that obtained using conventional thread fastening.

What is claimed is:
1. A sonic or ultrasonic seaming apparatus comprising:
   (a) a seaming station which includes:
      (a–1) an anvil;
      (a–2) an electro-acoustic converter having a resonator adapted to resonate at a high frequency, said resonator disposed opposite said anvil and providing with said anvil a nip through which a workpiece to be seamed is fed whereby said resonator is adapted to impart sonic energy to the workpiece to effect bonding;
   (b) a source of electric energy coupled to said converter for energizing said converter with electric energy whereby to cause said resonator to resonate at a certain velocity;
   (c) means for feeding the workpiece through said seaming station in continuous motion at adjustable feed rates; and
   (d) means coupling said means for feeding to said source of electric energy for controlling the velocity of said resonator in response to the feed rate of the workpiece through said station.

2. A sonic or ultrasonic seaming apparatus as set forth in claim 1, said means coupling said means for feeding to said source of electrical energy causing the velocity of said resonator to increase responsive to increasing feed rate.

3. A sonic or ultrasonic seaming apparatus as set forth in claim 2, said anvil being a rotatable member, and said means for feeding comprising motive means rotating said rotatable member.

4. A sonic or ultrasonic seaming apparatus as set forth in claim 3, said motive means being coupled to a foot-operable control device.

5. An ultrasonic seaming apparatus comprising:
   an electro-acoustic converter adapted to receive electrical energy for providing mechanical vibrations at an ultrasonic frequency;
   a mechanical resonator having an input surface and an output surface, the input surface of said resonator being coupled to said converter for receiving the mechanical vibrations from said converter and providing such vibrations at an increased amplitude at said output surface;
   an anvil disposed opposite said output surface and providing with said output surface a nip through which a workpiece to be seamed is fed whereby said resonator, when energized, is adapted to impart ultrasonic energy to the workpiece to effect bonding;
   a source of electrical energy coupled to said converter for energizing said converter with electrical energy and causing said resonator to resonate at a velocity determined by the electrical signal applied to said converter;
   means for feeding the workpiece through said nip in continuous motion at adjustable feed rates;
   means coupled to said means for feeding for adjustably controlling said feed rate, and
   means coupling said source of electrical energy to said means for controlling said feed rate for controlling the signal applied to said converter in response to said feed rate.

6. An ultrasonic seaming apparatus as set forth in claim 5, said means coupling said source of electrical energy to said means for controlling said feed rate causing the signal applied to said converter to provide increasing velocity as the feed rate increases.

7. An ultrasonic seaming apparatus as set forth in claim 5, said source including a direct current supply, a load circuit which includes said converter, and switching means between said supply and said load circuit; said means coupling said source of electrical energy to said means for controlling said feed rate comprising a means coupled for varying the potential of said direct current supply and being coupled also to said means for adjustably controlling said feed rate to provide for an increasing electrical potential with increasing feed rate.

8. An ultrasonic seaming apparatus as set forth in claim 5, said anvil being a rotatable wheel driven by said means for feeding the workpiece.

9. An ultrasonic seaming apparatus as set forth in claim 8, said wheel having a patterned peripheral surface for engaging the workpiece.

10. An ultrasonic seaming apparatus as set forth in claim 5, said resonator being a bar adapted to be resonant along its longitudinal axis.

11. An ultrasonic seaming apparatus as set forth in claim 5, said means for adjustably controlling said feed rate comprising a pressure responsive means coupled to provide, responsive to increasing pressure, increased electrical potential to said source of electrical energy and to said means for feeding the workpiece, and said pressure responsive means including a switching means for disconnecting said source of energy and said means for feeding from an external electrical supply in the absence of pressure being applied to said pressure responsive means.

12. A sonic or ultrasonic seaming apparatus comprising:
   a source of sonic or ultrasonic energy including a resonator which, when rendered resonant by said source, is adapted to transfer such energy to a workpiece disposed underneath the resonator;
   means for feeding the workpiece past said resonator at an adjustable speed, and
   further means coupled to said source and to said means for feeding for causing the velocity of the resonator to be responsive to the speed at which the workpiece is fed underneath said resonator.

13. A sonic or ultrasonic seaming apparatus as set forth in claim 12, said further means causing the velocity of said resonator to increase with increasing feed speed.

14. A sonic or ultrasonic seaming apparatus as set forth in claim 13, said further means causing said velocity to increase at a linear rate which is less than the increase of the feed rate.

15. An ultrasonic seaming apparatus comprising:
a rotatable anvil means having a cylindrical surface;
a source of ultrasonic energy having a resonator coupled thereto which has an input surface for receiving such energy from said source, and an opposite output surface for providing such energy to a workpiece contacted by said output surface;
means for mounting said anvil means and resonator in opposing relationship to cause said output surface to be disposed opposite a location along said cylindrical surface and forming a small gap therewith to provide a nip through which a workpiece to be seamed is transported;
an electric motor whose speed is proportional to the applied voltage coupled to said anvil means for causing rotation thereof;
an electric power supply coupled to said source of ultrasonic energy, said power supply and said source in combination coacting for causing the velocity of said resonator at said output surface to be proportional to the voltage amplitude applied as input to said power supply;

variable transformer means having a winding provided with a variable output tap, a fixed output tap, and a further fixed tap disposed between said variable output tap and said fixed output tap;
means coupling said motor to said variable output tap and said further fixed tap, and coupling said power supply with its input to said variable output tap and said fixed output tap, and
control means coupled to said variable output tap for controlling the speed of rotation of said anvil means and the velocity of said resonator in coordinated relation.

16. An ultrasonic seaming apparatus as set forth in claim 15, said source of ultrasonic energy including piezoelectric transducing means, and said power supply causing said piezoelectric transducing means to be operated at its parallel resonant frequency.

References Cited
UNITED STATES PATENTS

| | | | |
|---|---|---|---|
| 3,146,141 | 8/1964 | Woodland | 156—580 X |
| 3,222,239 | 12/1965 | Deans | 156—73 X |
| 3,224,915 | 12/1965 | Balamuth et al. | 156—73 |
| 3,447,995 | 6/1969 | Dankert et al. | 156—580 |
| 3,563,822 | 2/1971 | Fesh | 156—73 |

HAROLD ANSHER, Primary Examiner

U.S. Cl. X.R.

156—73, 274, 580